United States Patent
Kim et al.

(10) Patent No.: US 6,580,670 B2
(45) Date of Patent: Jun. 17, 2003

(54) OPTICAL PICKUP USING A SINGLE LIGHT SPOT TO GENERATE TRACKING ERROR SIGNAL AND REPRODUCTION SIGNAL

(75) Inventors: Tae-Kyung Kim, Suwon (KR); Chong-sam Chung, Suwon (KR); Young-man Ahn, Suwon (KR); Hea-jung Suh, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 95 days.

(21) Appl. No.: 09/854,922

(22) Filed: May 15, 2001

(65) Prior Publication Data

US 2002/0027843 A1 Mar. 7, 2002

(30) Foreign Application Priority Data

May 23, 2000 (KR) ........................................ 2000-27749

(51) Int. Cl.[7] ................................................. G11B 7/00
(52) U.S. Cl. ................................. 369/44.41; 369/44.35; 369/44.29
(58) Field of Search .......................... 369/44.27, 44.28, 369/44.29, 44.32, 44.34, 44.35, 44.41, 44.42, 53.23

(56) References Cited

U.S. PATENT DOCUMENTS 5,875,157 A * 2/1999 Sasaki et al. ............ 369/44.26
6,134,198 A * 10/2000 Yamamoto et al. ...... 369/44.35
6,314,068 B1 * 11/2001 Sano et al. ............... 369/44.32

* cited by examiner

*Primary Examiner*—Muhammad Edun
(74) *Attorney, Agent, or Firm*—Staas & Halsey LLP

(57) ABSTRACT

An optical pickup including a light detection element to divide light reflected from an optical recording medium into first through fourth light beam portions in a radial direction of the optical recording medium. From detection signals from the light detection element, a reproduction signal detection portion detects an information signal, and a tracking error signal detection portion detects a tracking error signal. The light source emits light that is focused as a single light spot on a main track of the optical recording medium. The tracking error signal detection portion gain controls and sums push-pull signals from the detection signals to detect, during a recording operation, a tracking error signal with reduced push-pull offset without erasing existing signals on adjacent tracks. The reproduction signal detection portion sums and gain controls the detection signals to detect an information signal containing reduced crosstalk from adjacent tracks.

37 Claims, 12 Drawing Sheets

RADIAL SHIFTING OF OBJECTIVE LENS [μm]

RADIAL SHIFTING OF OBJECTIVE LENS [μm]

RADIAL SHIFTING OF OBJECTIVE LENS [μm]

OPTICAL PICKUP USING A SINGLE LIGHT SPOT TO GENERATE TRACKING ERROR SIGNAL AND REPRODUCTION SIGNAL

CROSS-REFERENCE TO RELATED APPLICATIONS

This application claims the benefit of Korean Application No. 2000-27749, filed May 23, 2000, in the Korean Industrial Property Office, the disclosure of which is incorporated herein by reference.

BACKGROUND OF THE INVENTION

1. Field of the Invention

The present invention relates to an optical pickup capable of detecting a tracking error signal with reduced push-pull offset when an objective lens is shifted in a radial direction of an optical disk, and/or a reproduction signal including less crosstalk from adjacent tracks.

2. Description of the Related Art

The capacity of optical recording media for information recording and reproduction is dependent upon the size of a light spot focused on its information recording surface, and its track pitch whose width is determined in consideration of the light spot size. That is, the smaller the light spot and the track pitch, the greater the recording capacity.

As can be inferred from equation (1) below, the size of the light spot is proportional to the wavelength ($\lambda$) of the light, and is inversely proportional to the numerical aperture (NA) of an objective lens that focuses incident light to form the light spot on an information recording surface.

$$\text{size of the light spot } \lambda/NA \qquad (1)$$

On the other hand, the track pitch (tp) of an optical recording medium is determined by equation (2) so as to minimize track-to-track interference with respect to a reproduction signal.

$$t_p > 0.6 \times \frac{\lambda}{NA} \qquad (2)$$

For example, for a compact disk (CD), which uses a light source having a wavelength of 780 nm and an objective lens having an NA of 0.45, the track pitch of the CD is determined at 1.6 $\mu$m, which is greater than the result of 1.04 $\mu$m found using equation (2) with a $\lambda$=780 nm and an NA=0.45. For a digital versatile disk (DVD), which uses a light source having a wavelength of 650 nm and an objective lens having an NA of 0.6, the track pitch of the DVD is determined at 0.74 $\mu$m (equivalent to a recording density of 4.7 gigabytes), which is greater than the result of 0.65 $\mu$m found using equation (2) using a $\lambda$=650 nm and an NA=0.6.

Standard CDs and DVDs are designed to have a track pitch that satisfies the condition of equation (2), and thus considerable degradation of a reproduction signal caused by adjacent tracks does not occur during recording/reproduction operation.

Meanwhile, for future generation DVDs, so-called "high-definition DVDs" (HD-DVDs), which have been developed to increase the recording density up to 15 gigabytes or more, equation (2) above cannot be used to determine a standard track pitch of the HD-DVDs. For example, given that an optical pickup using a 400 nm light source and an objective lens having an NA of 0.6 is used with HD-DVDs, the track pitch calculated using the right side of equation (2) above, is 0.4 $\mu$m. However, the track pitch of 0.4 $\mu$m is too wide to achieve the high recording capability of 15 GB or more. Thus, a standard track pitch of HD-DVDs should be 0.4 $\mu$m or less.

When reproducing information from HD-DVDs currently under development, there is also a problem of crosstalk between adjacent tracks. Thus, there is a need to reduce degradation of a reproduction signal caused by interference between adjacent tracks due to the narrow track pitch.

At the same time, for recordable optical disks, a push-pull signal is detected as a tracking error signal. A drawback of the push-pull signal is that a large offset occurs when the objective lens is shifted in the radial direction of an optical disk. In order to reduce the push-pull offset, a conventional technique uses a grating such that a main light spot and first and second sub-light spots are focused on the main track and adjacent tracks of an optical recording medium, thereby detecting a tracking error signal using a differential push-pull technique.

A conventional optical pickup using such a grating is shown in FIG. 1. Light emitted from a light source 1 is diffracted and split into a 0th-order diffracted beam 1a and ±1st-order diffracted beams 1b, 1c by a grating 2. The split beams 1a, 1b, 1c are reflected by a beam splitter 3 and a mirror 4, collimated by a collimating lens 6, and focused by an objective lens 5. As a result, light spots of beams 1a, 1b, 1c are formed on an optical disk 10 as shown in FIG. 2. The main beam 1a, which is the 0th-order diffracted beam, is focused on the target track 12, and the first and second sub-beams 1b and 1c are focused to be displaced from the main beam 1a by ±½ the track pitch in the radial direction of the optical disk 10, leading and following the main beam 1a.

After having been reflected from the optical disk 10, the main beam 1a and the first and second sub-beams 1b and 1c pass the objective lens 5 and the beam splitter 3, and are then received by a photodetection unit 8 through a sensing lens 7 to condense incident light on the first, second and third photodetectors 8a, 8b and 8c. The photodetection unit 8, as shown FIG. 2, includes a first photodetector 8a to receive the main beam 1a, and the second and third photodetectors 8b and 8c to receive the first and second sub-beams 1b and 1c, respectively. Each of the first, second and third photodetectors 8a, 8b and 8c performs photoelectric conversion, and consists of two split plates arranged in the radial direction of the optical disk.

A tracking error signal detection unit 20 detects a tracking error signal using a differential push-pull technique, which is used in the conventional optical pickup. The tracking error signal detection unit 20 includes first, second, third and fourth differential parts 21, 23, 25 and 29, and first and second amplifiers 27 and 28, and detects a tracking error signal, which contains no push-pull offset, by the conventional differential push-pull technique.

In particular, the first through third differential parts 21, 23, 25 receive the electrical signals from the first through third photodetectors 8a, 8b and 8c, and output first through third push-pull signals, respectively. A first amplifier 27 amplifies the third push-pull signal from the third differential part 25 with a predetermined gain factor G1, and a second amplifier 28 amplifies the sum of the signal output from the first amplifier 27 and the second push-pull signal from the second differential part 23 with a predetermined gain factor G2. The fourth differential part 29 subtracts the signal output from the second amplifier 28 from the first push-pull signal resulting from the main beam 1a, which is output from the first differential part 21, and outputs a tracking error signal. The gain factors G1 and G2 for the first and second amplifiers 27 and 28 are determined based on the intensities of the main beam 1a and the first and second sub-beams 1b and 1c. The fourth differential part 29 outputs a tracking error signal without push-pull offset and thus the tracking error signal detected in the conventional optical pickup includes no push-pull offset even when the objective lens is shifted in the radial direction of the optical disk.

However, the conventional optical pickup detects the tracking error signal by splitting light emitted from the light source 1 into three beams using the grating 2, so that the light efficiency of the main beam 1 is insufficient to record information on the optical disk. In addition, during a recording operation, information signals recorded on adjacent tracks are possibly erased by the first and second sub-beams 1b and 1c.

SUMMARY OF THE INVENTION

To solve the above and other problems, it is an object of the present invention to provide an optical pickup suitable for high-density optical recording media having narrow track pitch, in which a single light spot is focused on only a main track of an optical recording medium during recording so that information signals recorded on adjacent tracks are not erased, and where a signal can be detected with reduced offset when an objective lens is shifted in the radial direction of the optical recording medium such that a reproduction signal having less crosstalk from adjacent tracks can be detected.

Additional objects and advantages of the invention will be set forth in part in the description which follows and, in part, will be obvious from the description, or may be learned by practice of the invention.

To achieve the above and other objects of the present invention, an optical pickup according to an embodiment of the present invention includes a light source, an optical path changer to alter the traveling path of incident light, an objective lens disposed on the optical path between the optical path changer and an optical recording medium, the objective lens to focus incident light, a light detection unit to detect light incident through the objective lens and the optical path changer after having been reflected from the optical recording medium, and a signal processor having a tracking error signal detection portion to detect a tracking error signal from detection signals output from the light detection unit, wherein light emitted from the light source is focused as a single light spot on the optical recording medium, the light detection unit divides light reflected from the optical recording medium into first through fourth light beam portions in the radial direction of the optical recording medium, and detects the first through fourth light beam portions, and the tracking error signal detection portion amplifies or attenuates detection signals from the first and fourth light beam portions, which are outwards of the second and third light beam portions, or from the second and third light beam portions, and detects a push-pull signal using the gain controlled detection signals and the remaining detection signals.

According to an aspect of the present invention, the tracking error signal detection portion comprises a first differential part to subtract the detection signals from the first and third light beam portions, a second differential part to subtract the detection signals from the second and third light beam portions, an adder to sum the signals from the first and second differential parts, and a gain controller connected between the first or second differential part and an input end of the first adder, the gain controller to amplify or attenuate the signal from the first or second differential part with a predetermined gain factor, and to output the product to the first adder so that the first adder outputs a tracking error signal with reduced push-pull offset.

According to another aspect of the present invention, the tracking error signal detection portion detects a tracking error signal expressed as tracking error signal=$(a-d)+\alpha(b-c)$ where a, b, c and d represent the detection signals from the first through fourth light beam portions, respectively, and $\alpha$ is the gain factor of the gain controller.

According to still another aspect of the present invention, the signal processor further comprises a reproduction signal detection portion including a gain controller to amplify or attenuate a first sum signal of the detection signals from the first and fourth light beam portions, or a second sum signal of the detection signals from the second and third light beam portions, with a predetermined gain factor, and an adder having a first input end that receives the signal from the gain controller and a second end that receives one of the first and second sum signals, which does not pass through the gain controller, the adder to sum the received signals and to output the sum of the received signals as a reproduction signal containing less crosstalk from adjacent tracks.

According to yet another aspect of the present invention, the light detection unit is a photodetector having first through fourth light receiving portions arranged in a radial direction of the optical recording medium, the first through fourth light receiving portions to receive the first through fourth light beam portions, respectively, and to independently convert the first through fourth light beam portions to electrical signals.

According to a further aspect of the present invention, the light detection unit comprises an optical member to selectively diffract light incident after having been reflected from the optical recording medium so as to divide the incident light into the first through fourth light beam portions in the radial direction of the optical recording medium, and first through fourth photodetectors to receive the first through fourth light beam portions from the optical member, and to convert the received first through fourth light receiving portions to corresponding electrical signals.

BRIEF DESCRIPTION OF THE DRAWINGS

The above and other objects and advantages of the invention will become more apparent and more readily appreciated from the following description of the preferred embodiments, with reference to the attached drawings in which.

DETAILED DESCRIPTION OF THE PREFERRED EMBODIMENTS

Figure 1:
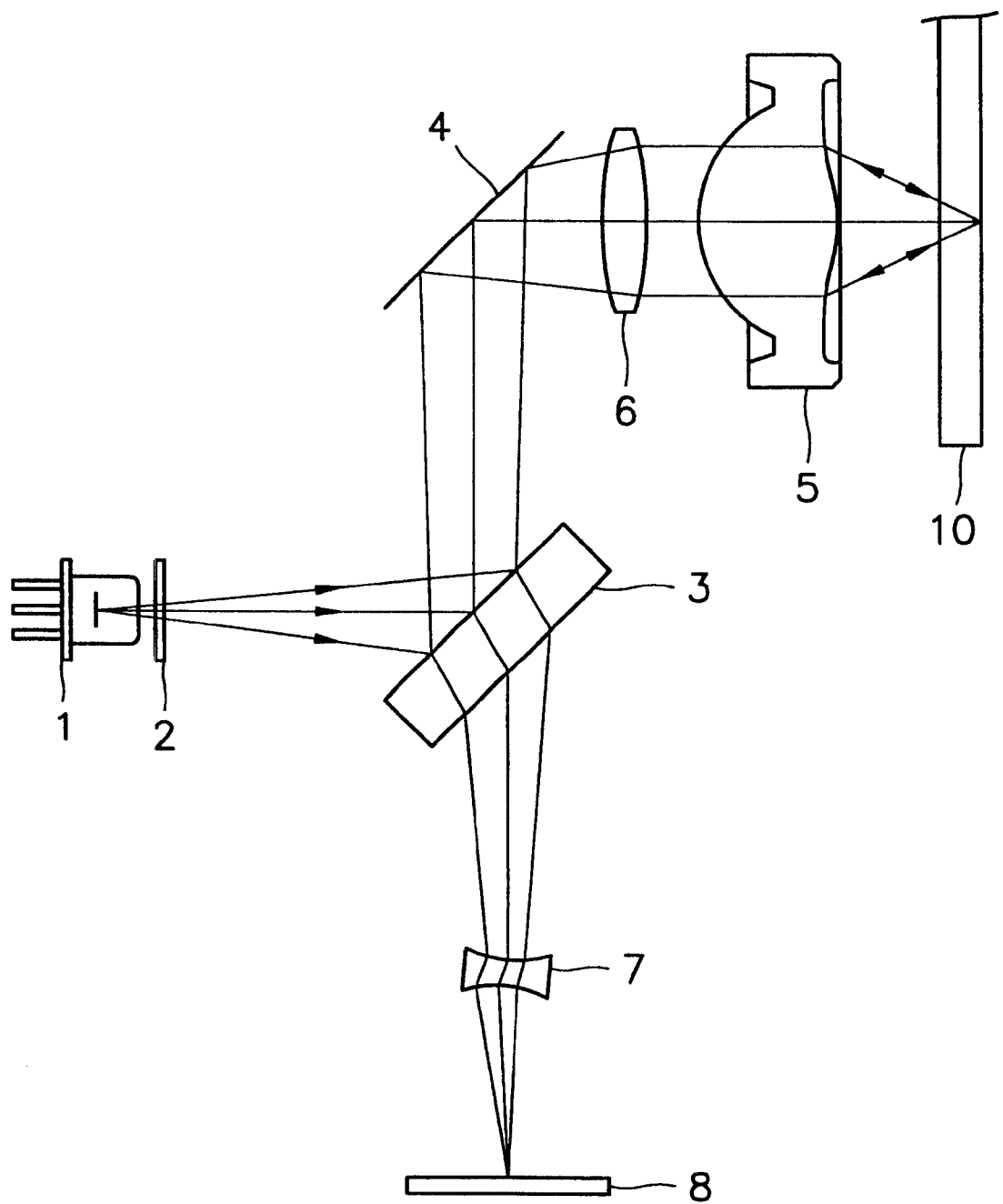
FIG. 1 is a schematic view showing the optical arrangement of a conventional optical pickup using a grating.
Figure 2:
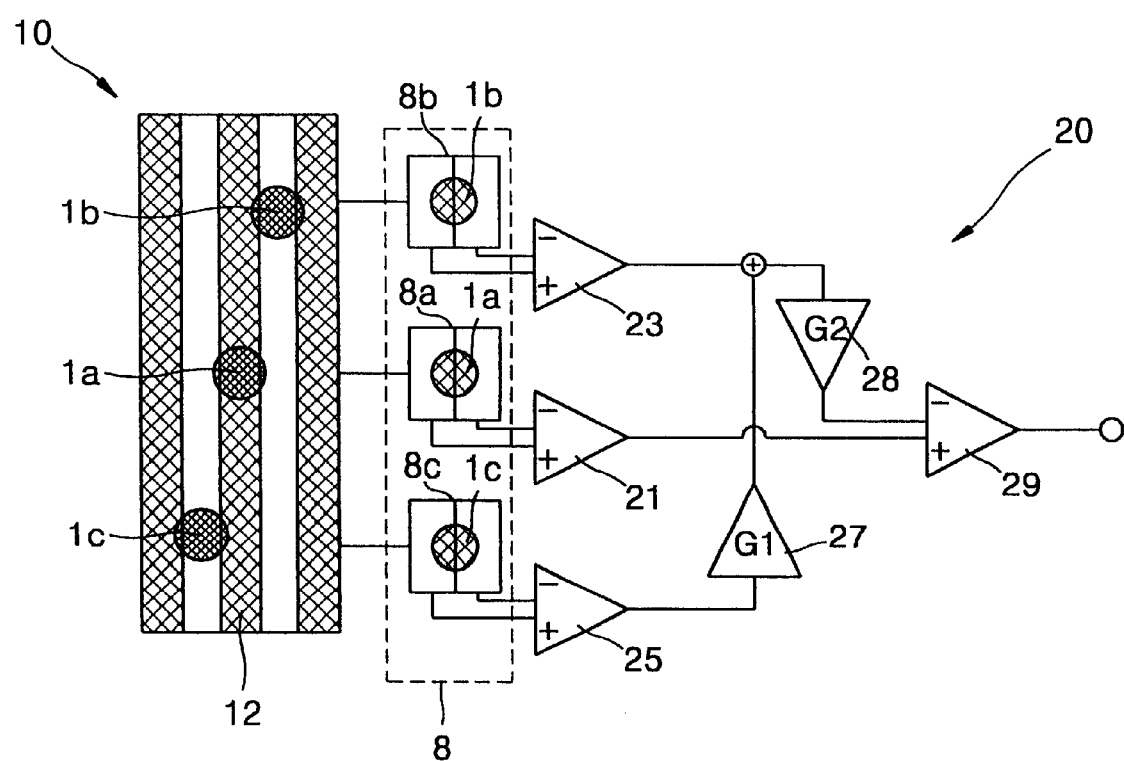
FIG. 2 is a schematic view showing the structure of the photodetection unit and the tracking error signal detection unit used in the conventional optical pickup that detects a tracking error signal using a differential push-pull technique.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
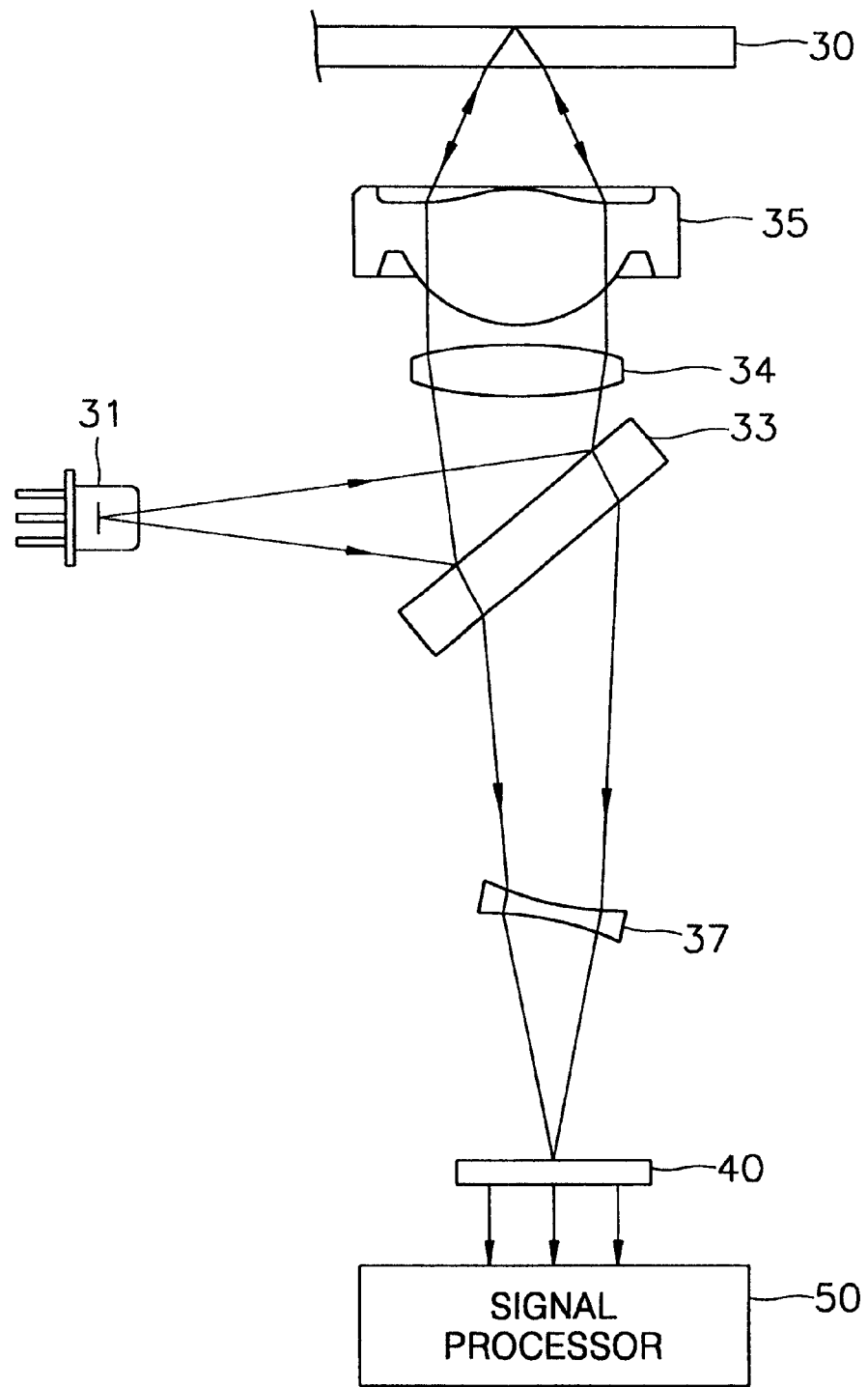
FIG. 3 is a schematic view showing an embodiment of an optical pickup according to the present invention.

Referring to FIG. 3, an optical pickup according to an embodiment of the present invention includes a light source 31, an optical path changer 33 to alter the traveling path of incident light, a collimating lens 34 and an objective lens 35 arranged on the optical path between the optical path changer 33 and an optical recording medium 30 to respectively collimate and focus incident light, a light detection unit 40 to receive light having passed through the objective lens 35, the optical path changer 33, and having been condensed by a sensing lens 37 after having been reflected from the optical recording medium 30, and a signal processor 50 to detect a tracking error signal and an information signal from the signal received by the light detection unit 40.

The light source 31 may be a semiconductor laser, such as vertical cavity surface emitting laser (VCSEL) or an edge-emitting laser. The light source 31 preferably emits blue light (light having a wavelength of 400 nm) such that the light source 31 is suitable for a high-definition digital versatile disk (HD-DVD) family of optical recording media, which have been developed to have a recording capacity of 15 GB or more.

The optical path changer 33 may be, for example, a beam splitter. The light incident from the light source 31 is reflected by the optical path changer 33, such that the light goes toward the optical recording medium 30. Meanwhile, the light reflected by the optical recording medium 30 is transmitted by the optical path changer 33 and goes toward the light detection unit 40.

Figure 4:
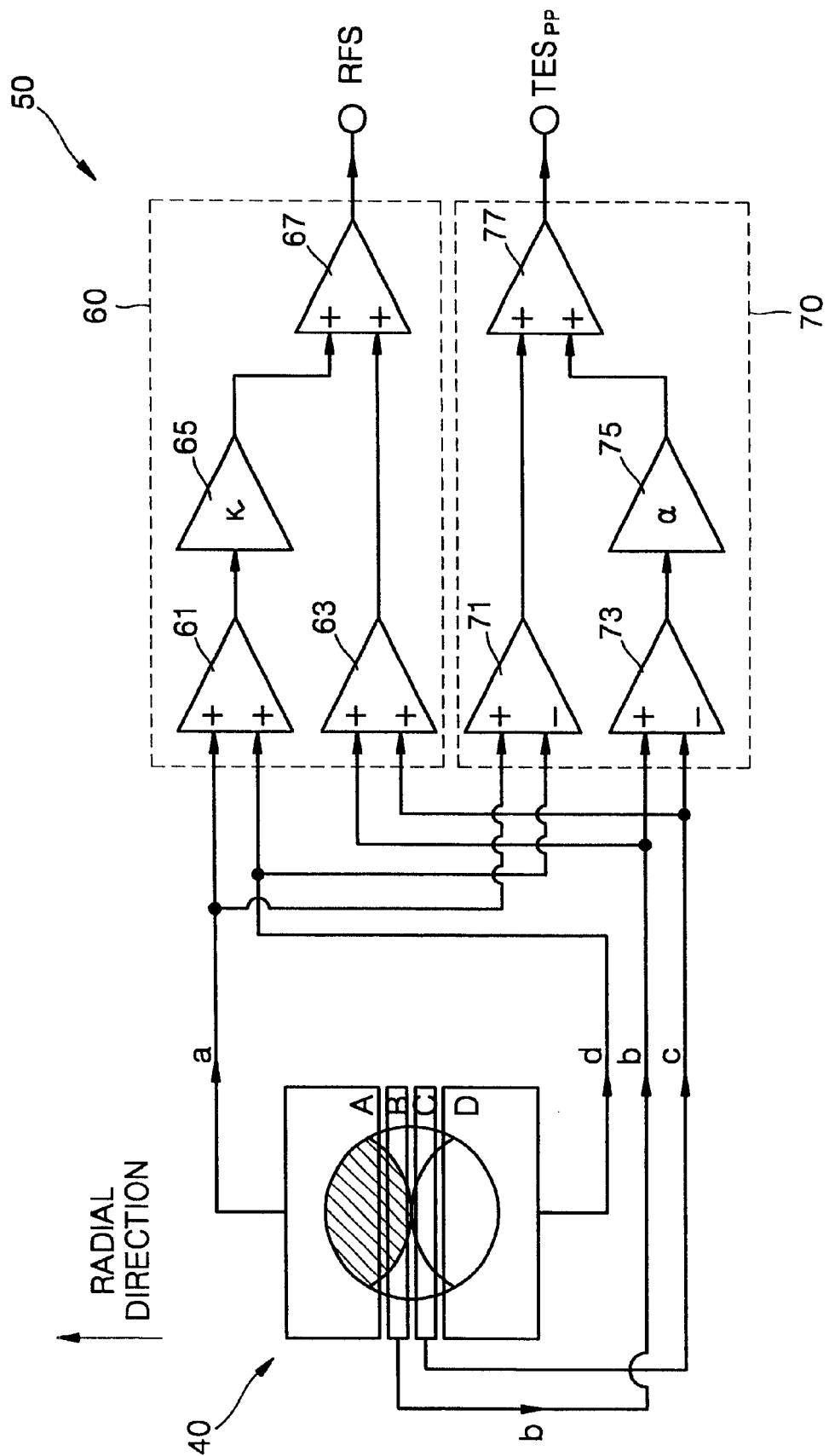
FIG. 4 is a schematic view showing the structure of the photodetector and the signal processor shown in FIG. 3 according to an embodiment of the present invention.

The light detection unit 40 divides the light reflected from the optical recording medium 30 into first through fourth light beam portions in the radial direction of the optical recording medium 30, and detects the light beam portions. As shown in FIG. 4, the light detection unit 40 comprises a photodetector having first, second, third, and fourth light receiving portions A, B, C and D, which are arranged in the radial direction of the optical recording medium 30. The first through fourth light receiving portions A through D divide incident light reflected by the optical recording medium 30 into first through fourth light beam portions, receive the four light beam portions, respectively, and convert the received light beam portions to electrical signals.

The width of the second and third light receiving portions B and C is determined such that they receive about 10–90% of the diameter of the incident beam in the radial direction of the optical recording medium 30. The width of the second and third light receiving portions B and C is associated with the arrangement of the entire optical pickup and gain factors $\alpha$ and $\kappa$, which will be described later.

The optical pickup according to an embodiment the present invention, which has the optical arrangement described above in FIGS. 3 and 4, focuses light emitted from the light source 31 to form a single light spot on the main track of the optical recording medium 30. Due to the high light power efficiency, the optical pickup can be used for recording. In addition, unlike a conventional optical pickup using a grating, there is no erasing of signals recorded on adjacent tracks.

As shown in FIG. 4, the signal processor 50 includes a tracking error signal detection portion 70 to detect a tracking error signal TESpp, and a reproduction signal detection portion 60 to detect a reproduction signal RFS. The tracking error signal detection portion 70 includes a first differential part 71 to receive and subtract the signals received by the first and fourth light receiving portions A and D, which are arranged outside the second and third light receiving portions B and C. The tracking error signal detection portion 70 also includes a second differential part 73 to receive and subtract the signals received by the second and third light receiving portions B and C, which are arranged inside the first and fourth light receiving portions A and D. The tracking error signal detection portion 70 also includes an adder 77 to sum the signals from the first and second differential parts 71 and 73, and a gain controller 75 connected between the output end of the second differential part 73 and one input end of the adder 77. While not shown, it is understood that the gain controller 75 could be connected to the output end of the first differential part 71 instead of the second differential part 73 as shown. Further, it is also understood that the gain controller 75 could be attached to both differential parts 71 and 73 such as if the gain controller 75 to include two sub-gain controllers that individually amplify/attenuate the signals from the differential parts 71 and 73

The gain controller 75 is connected between the second differential part 73 and the adder 77 so that the gain controller 75 amplifies or attenuates the signal from the second differential part 73 with a predetermined gain factor a and outputs the result to the adder 77. The gain factor $\alpha$ of the gain controller 75 is adjusted such that the tracking error signal TESpp includes a minimum push-pull offset.

Assuming that the signals received by the first through fourth light receiving portions A through D are a, b, c, and d, respectively, and the gain factor of the gain controller 75 is α, the tracking error signal TESpp output from the adder 77 is expressed by equation (3):

$$TESpp = (a-d) + \alpha(b-c) \quad (3)$$

Even when the objective lens 35 is shifted in the radial direction of the optical recording medium 30, the tracking error signal TESpp output from the tracking error signal detection portion 70 having the above configuration contains almost no push-pull offset.

The reproduction signal detection portion 60 is configured such that the reproduction signal RFS output from the reproduction signal detection portion 60 contains reduced crosstalk from adjacent tracks, which enables the optical pickup to be used for a high-density optical recording medium having a narrow track pitch such as the HD-DVD family of optical recording media. In particular, the reproduction signal detection portion 60 includes a first adder 61 to receive and sum the signals a and d detected by the first and fourth light receiving portions A and D, a second adder 63 to receive and sum the signals b and c detected by the second and third light receiving portions B and C, a third adder 67 to sum the signals from the first and second adders 61 and 63, and a gain controller 65 connected between the output end of the first adder 61 and one input end of the third adder 67. It is understood, but not shown, that the first and second adders 61 and 63 can be removed from the reproduction signal detection portion 60 so that the sum of the signals a and d detected by the first and fourth light receiving portions A and D, and the sum of the signals b and c detected by the second and third light receiving portions B and C are directly applied to the gain controller 65 and the third adder 67, respectively. It is further understood that the gain controller 65 can be connected to the output end of the second adder 63 instead of the first adder 61, as shown.

The gain controller 65 is connected between the output end of the first adder 61 and one input end of the third adder 67 so that the gain controller 65 amplifies or attenuates the signal from the first adder 61 with a predetermined gain factor κ and outputs the result to the third adder 67. The gain factor κ of the gain controller 65 is adjusted such that the reproduction signal RFS includes a minimum crosstalk from adjacent tracks.

Assuming that the gain factor of the gain controller 65 is κ, the reproduction signal RFS output from the third adder 67 is expressed by equation (4):

$$RFS = (b+c) + \kappa(a+d) \quad (4)$$

The optical pickup according to an embodiment of the present invention forms a single light spot only on a main track of the optical recording medium, and thus its optical power efficiency is high. Accordingly, the optical pickup according to the present invention is useful for recording, and the problem of erasing signals recorded on adjacent tracks during recording does not occur. In addition, even when the objective lens is shifted in the radial direction of the optical recording medium, a tracking error signal, which contains reduced push-pull signal offset, can be detected. A reproduction signal read from an optical recording medium by the optical pickup contains reduced crosstalk from adjacent tracks, and thus the optical pickup can be used with high-density optical recording media having narrow track pitch.

Figure 5:
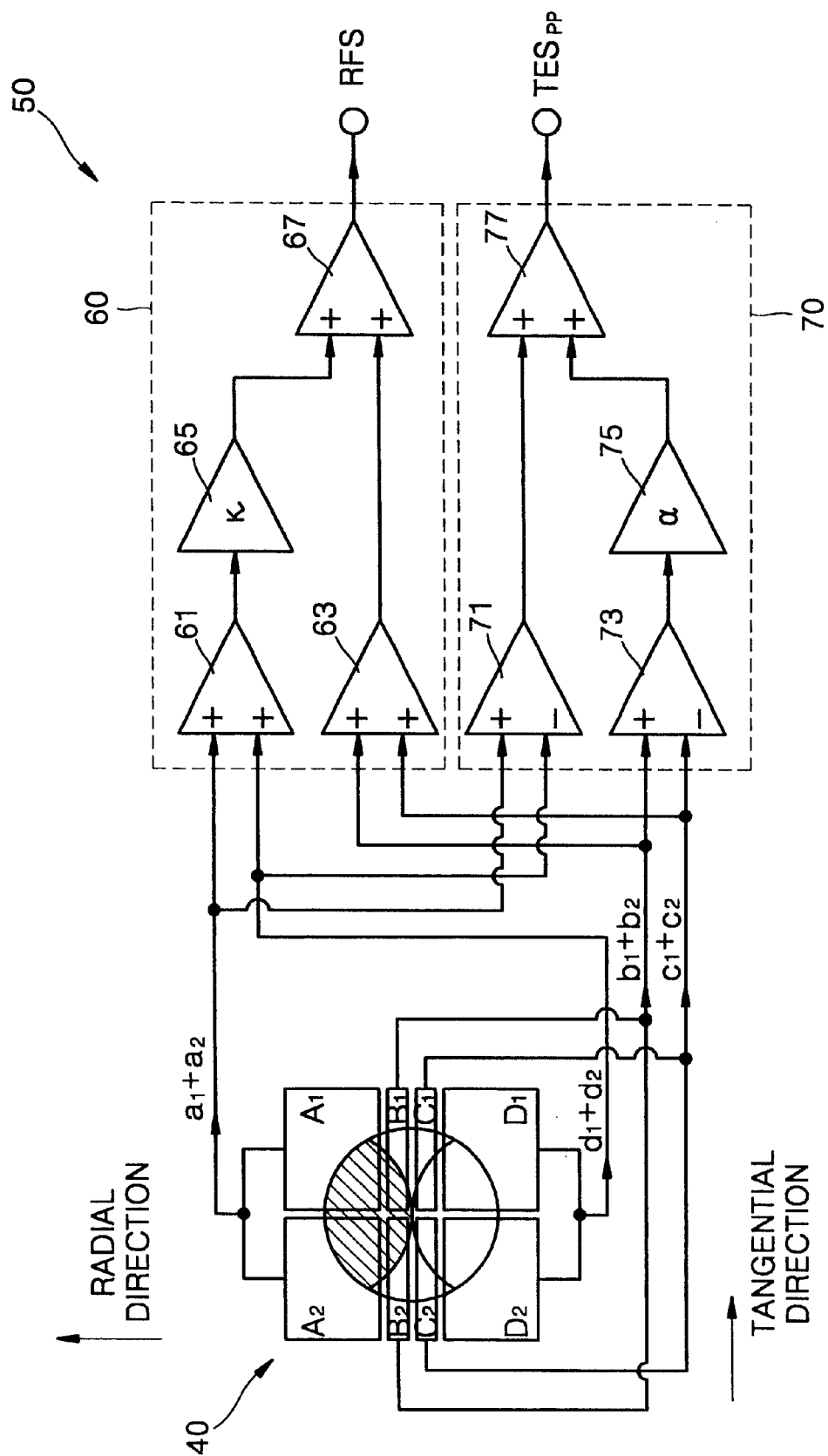
FIG. 5 is a schematic view showing another photodetector shown in FIG. 3 according to another embodiment of the present invention.

Although an embodiment of the optical pickup according to the present invention is shown in FIGS. 3 and 4 and has been described with reference to the photodetector 40 having four light receiving portions, the photodetector 40 can be constructed to have eight light receiving portions A1, A2, B1, B2, C1, C2, D1 and D2 by further dividing each of the first through fourth light receiving portions A through D of FIG. 3 into two sections in a tangential direction of the optical recording medium 30 as shown in FIG. 5. According to the embodiment of the present invention shown in FIG. 5, the photodetector 40 is able to detect a focus error signal using a conventional technique for use with a quadrant photodetector. As illustrated in FIG. 5, in order to detect the tracking error signal TESpp and the reproduction signal RFS, the sums of the signals received by the two sections of each light receiving portion (i.e., (a1+a2), (b1+b2), (c1+c2), and (d1+d2)) are utilized. The structures of the reproduction signal detection portion 60 and the tracking error signal detection portion 70 shown in FIG. 5 are substantially the same as those shown in FIG. 4.

Figure 6A:
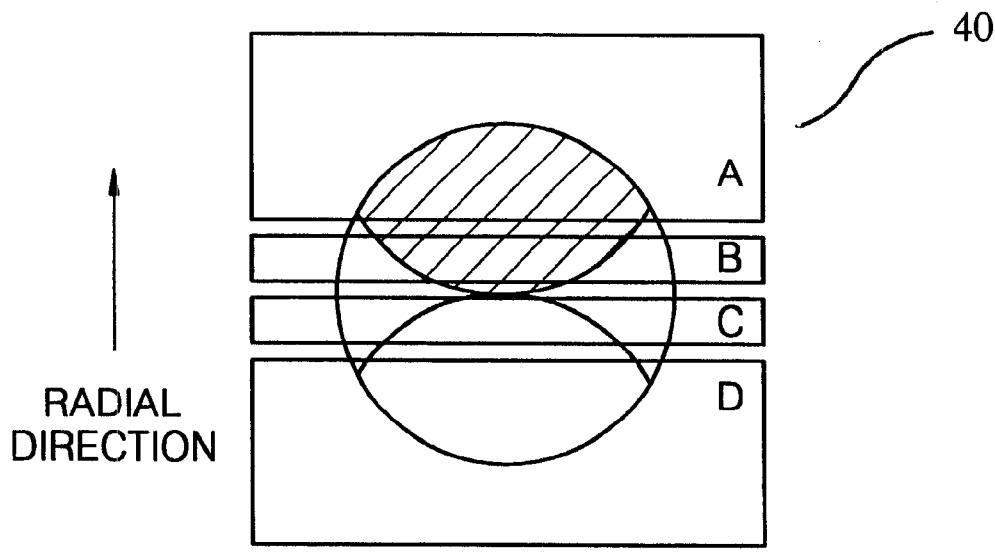
FIGS. 6A and 6B are plan views showing the distribution of light on the photodetector according to an embodiment of the present invention when an objective lens is not shifted in the radial direction of the optical disk, and when the objective lens is shifted, respectively.
Figure 6B:
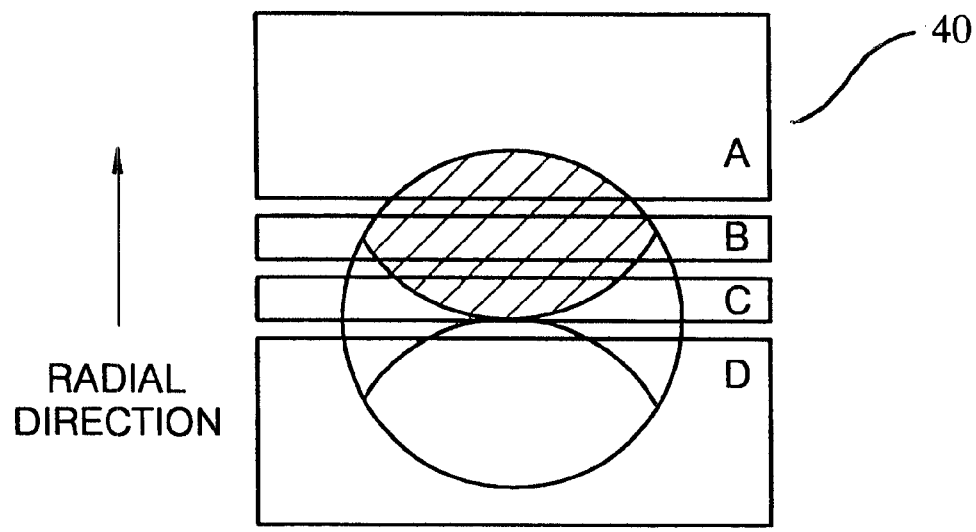

The detection of the tracking error signal TESpp having reduced push-pull offset, and the reproduction signal RFS containing reduced crosstalk from adjacent tracks will be described. In detecting a tracking error signal TESpp with reduced push-pull offset, as shown in FIG. 6A, the optical pickup according to an embodiment of the present invention is constructed such that a center of the photodetector 40 is aligned with the optical axis of the objective lens 35 so that a center of incident light enters the center of the photodetector 40. However, since the optical axis of the objective lens 35 is shifted from the center of the photodetector 40 when the optical recording medium 30 is run out or when the objective lens 35 is driven by an actuator (not shown) to seek for a target track, as shown in FIGS. 6A and 6B, the distribution of light on the photodetector 40 is also shifted in the radial direction of the optical recording medium 30. The optical pickup according to the present invention can detect a tracking error signal TESpp having almost no push-pull offset, as shown in FIGS. 7 through 9, even when shifting of the objective lens 35 occurs in the radial direction of the optical recording medium 30.

Figure 7:
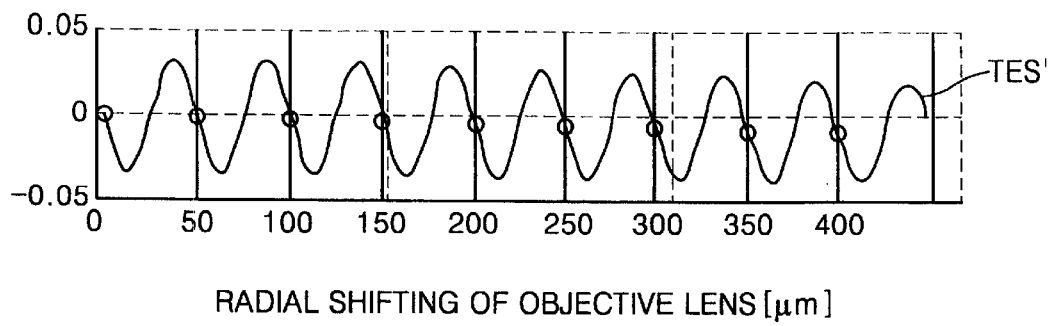
FIG. 7 is a graph illustrating a tracking error signal detected using a conventional push-pull technique.
Figure 8:
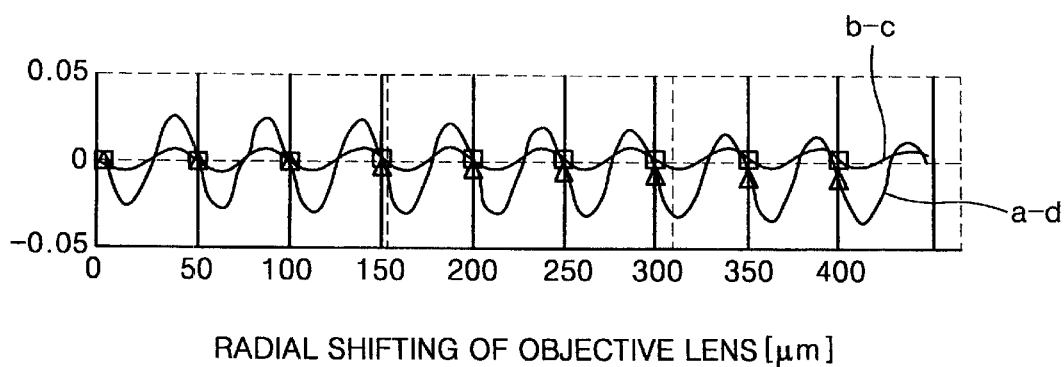
FIG. 8 is a graph illustrating a push-pull signal resulting from the signals received by the second and third light receiving portions of the photodetector, and a push-pull signal resulting from the signals received by the first and fourth light receiving portions A and B of the photodetector according to an embodiment of the present invention.
Figure 9:
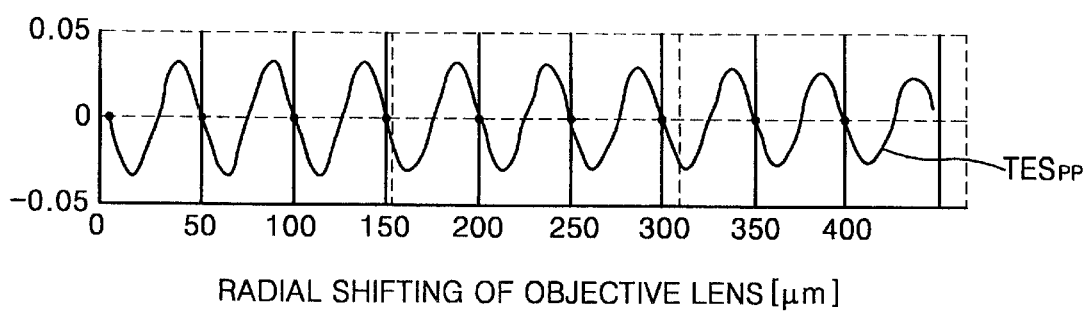
FIG. 9 is a graph illustrating a tracking error signal when the gain controller of the tracking error signal detection unit has a gain factor ($\alpha$) of 5.6739 according to an embodiment of the present invention.

FIGS. 7 through 9 illustrate the signals detected by the photodetector 40 after receiving the light that was emitted from a 400-nm light source 31 and reflected by a RAM type optical recording medium 30 having lands/grooves with respect to the degree of radial shifting of the objective lens 35, wherein light emitted from the light source is focused by an objective lens 35 having an NA of 0.65 on the optical recording medium 30 having a 0.30-μm-wide groove. In FIGS. 7 through 9, the X-axis represents the degree of radial shifting of the objective lens 35 every 50 μm. In the optical pickup used to detect the signals of FIGS. 7 through 9, the width of the groove gw=0.30 μm, λ=400 nm, and NA=0.65, and thus $$\frac{gw}{\frac{\lambda}{NA}} = 0.49.$$

In other words, unlike standard CDs and DVDs which satisfy the condition expressed by equation (2) above, the RAM type optical recording medium 30 used has a recording density of 18 GB and thus has a narrower track pitch not satisfying equation (2).

As shown in FIG. 7, for a tracking error signal TES' detected using a conventional push-pull technique, the amount of push-pull offset increases as the degree of radial shifting of the objective lens 5 increases. FIG. 8 illustrates a push-pull signal (b−c) from the second and third light receiving portions B and C of the photodetector 40 according to an embodiment of the present invention, and a push-pull signal (a−d) from the first and fourth light receiving portions A and D of the photodetector 40, with respect to the degree of radial shifting of the objective lens 35. FIG. 9 illustrates the tracking error signal TESpp output from the tracking error signal detection portion 70 of the optical pickup according to the present invention, which results using equation (3) above with the gain factor ($\alpha$) of 5.6739 of the gain controller 75.

Referring to FIG. 8, like the tracking error signal TES' detected by the conventional technique and shown in FIG. 7, the push-pull signals (b−c) and (a−d) include a considerable amount of offset. The amount of offset of the push-pull signals (b−c) and (a−d) increases as the degree of radial shifting of the objective lens 35 increases. In contrast, when the push-pull signal (b−c) is multiplied by the gain factor ($\alpha$=5.6739) and summed with the push-pull signal (a−d) using the tracking error signal detection technique according to an embodiment of the present invention, the tracking error signal TESpp, which includes almost no push-pull offset, is output although radial shifting of the objective lens 35 occurs.

The amount of push-pull offset of the tracking error signals shown in FIGS. 7 and 9 is tabulated in Table 1.

TABLE 1

| Degree of Radial shifting of | Amount of Push-pull Offset | |
|---|---|---|
| Objective lens ($\mu$m) | Conventional Method | Present Invention |
| 50 | 1.6% (5 nm) | 0.6% (2 nm) |
| 100 | 3.1% (9 nm) | 1.1% (3 nm) |
| 150 | 4.8% (14 nm) | 1.6% (5 nm) |
| 200 | 6.6% (20 nm) | 1.8% (5 nm) |
| 250 | 8.5% (26 nm) | 1.7% (5 nm) |
| 300 | 10.6% (32 nm) | 1.5% (4 nm) |
| 350 | 12.9% (39 nm) | 0.9% (3 nm) |
| 400 | 15.4% (46 nm) | 0.0% (0 nm) |

Figure 10:
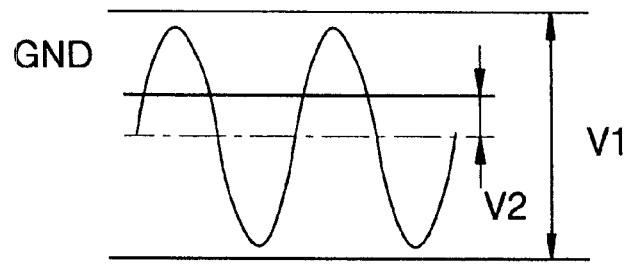
FIG. 10 is a graph illustrating push-pull offset.

As shown in Table 1, the tracking error signal TESpp detected by the optical pickup according to an embodiment of the present invention contains much less push-pull offset than the tracking error signal TES' detected by the conventional push-pull method. Referring to FIG. 10, if the maximum amplitude of the tracking error signal is V1, and the difference between the ground level GND and the middle level of the tracking error signal is V2, the amount of push-pull offset is expressed in Table 1 as V2/V1×100%. The values in parenthesis, which are expressed in nanometers, represent the degree of deviation of the optical spot from a center of a target track, and are equivalent to the respective degree of et percentages.

Figure 11:
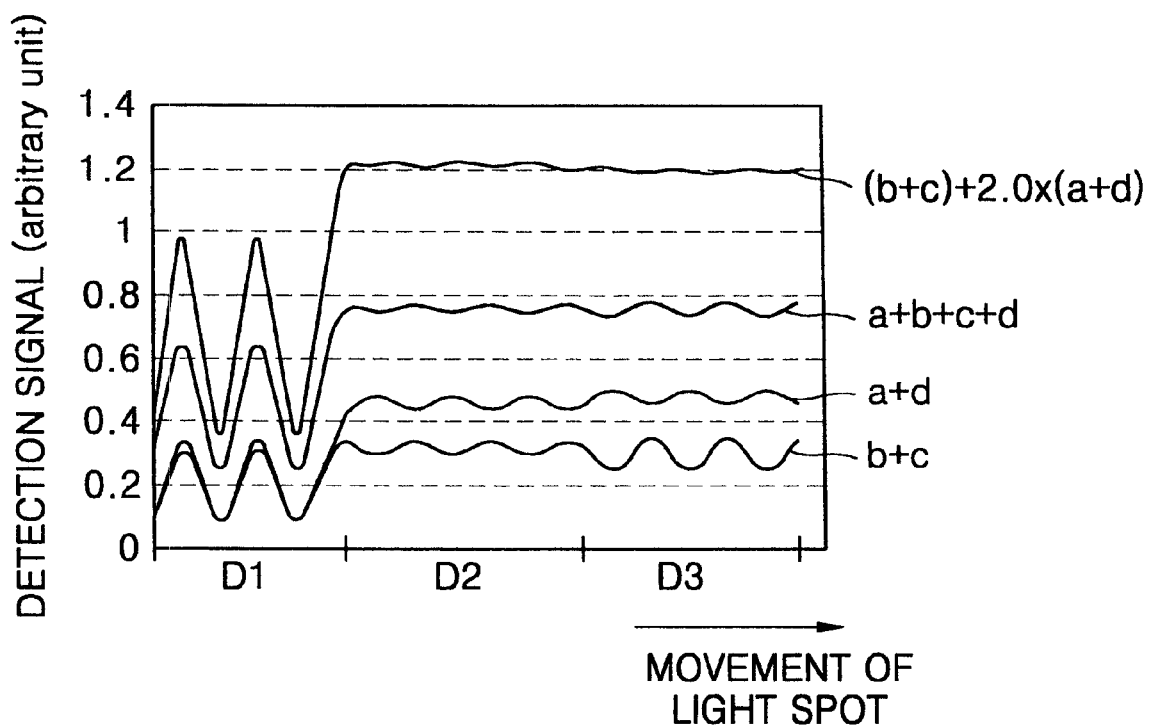
FIG. 11 is a graph illustrating detection signals read from the main track of an optical recording medium by the optical pickup according to an embodiment of the present invention.

The optical pickup according to an embodiment of the present invention can detect a reproduction signal RFS with reduced crosstalk from adjacent tracks. The light emitted from the light source 31 is focused by the objective lens 35 to form a light spot on a main or target track of the optical recording medium 30. At this time, due to narrow track pitch of the optical recording medium 30, the light spot is partially projected onto adjacent tracks as well as the main track. Thus, the sum (b+c) of the detection signals of the second and third light receiving portions B and C, and the sum (a+d) of the detection signals of the first and fourth light receiving portions A and D are affected by the adjacent tracks as shown in FIG. 11. In FIG. 11, the horizontal axis indicates the movement of the light spot on the main track along the track direction: D1 is a region including record marks only on the main track, D2 is a region including record marks only on one adjacent track, but not on either the other adjacent track or the main track, and D3 is a region including record marks only on the two adjacent tracks, but not on the main track. The vertical axis indicates a detection signal level in arbitrary units.

The sum (b+c) of the detection signals of the second and third light receiving portions B and C, and the sum (a+d) of the detection signals of the first and fourth light receiving portions A and D have the same phase in the region D1. Meanwhile, the two sums have a phase difference of about 180° in the regions D2 and D3. As in the conventional reproduction signal detection method, if all detection signals a, b, c and d of a photodetector are merely summed and the sum of the detection signals is output as a reproduction signal, due to interference from adjacent tracks, a serious time-axial fluctuation occurs in the region D3 where no information is recorded. In other words, the reproduction signal detected by the conventional method includes a large amount of crosstalk caused by interference from adjacent tracks.

In contrast, using the optical pickup according to an embodiment of the present invention, the sum (a+d) of the detection signals of the first and fourth light receiving portions A and D, which have a relatively small amplitude, is amplified with a predetermined gain factor, for example, $\kappa$=2.0, and then added with the sum (b+c) of the detection signals of the second and third light receiving portions B and C. The result of the summation is output as the reproduction signal RFS. Thus, the reproduction signal RFS from the region D3 in which information is not recorded includes almost no time-axial fluctuation. As a result, a quality information signal with reduced crosstalk from adjacent tracks can be obtained even when the optical recording medium 30 has a narrow track pitch.

Figure 12:
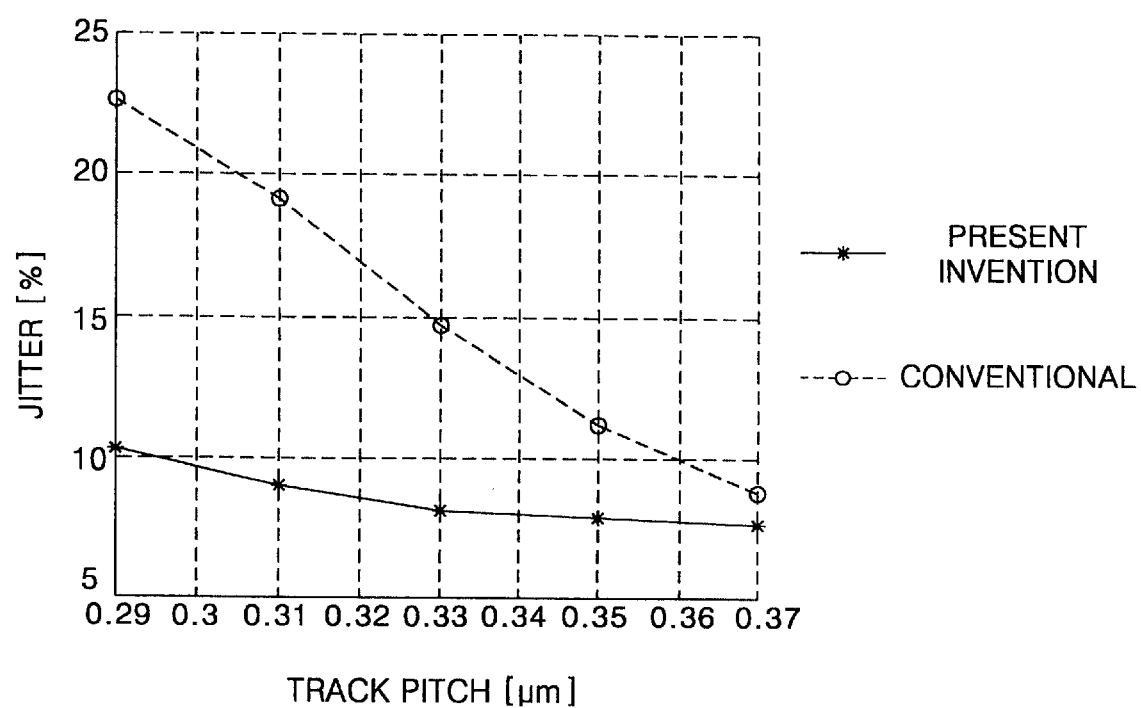
FIG. 12 is a graph comparatively showing the jitter characteristic of the reproduction signals with respect to track pitches detected using a conventional optical pickup and the optical pickup according to an embodiment of the present invention.

FIG. 12 illustrates the jitter characteristic of a reproduction signal with respect to the track pitch of the optical recording medium 30, in which a light source 31 having a wavelength of 400 nm and an objective lens 35 having an NA of 0.6 are used, and the optical recording medium 30 used has a minimum mark length of 0.29 $\mu$m and a pit height of −0.25 $\lambda$. As shown in FIG. 12, as the track pitch of the optical recording medium 30 narrows, the jitter characteristics of the reproduction signal detected by the conventional method abruptly degrade due to crosstalk from adjacent tracks. When the track pitch becomes narrower at 0.29 $\mu$m, the jitter of the reproduction signal is as much as 23%. In contrast, for the reproduction signal RFS reproduced using the optical pickup according to an embodiment of the present invention, although the track pitch is decreased to 0.29 $\mu$m, the jitter is approximately 10%, due to the reduced crosstalk.

As previously discussed, the optical pickup according to the present invention can detect a quality reproduction signal even when the track pitch of the optical recording medium used is narrow.

Figure 13:
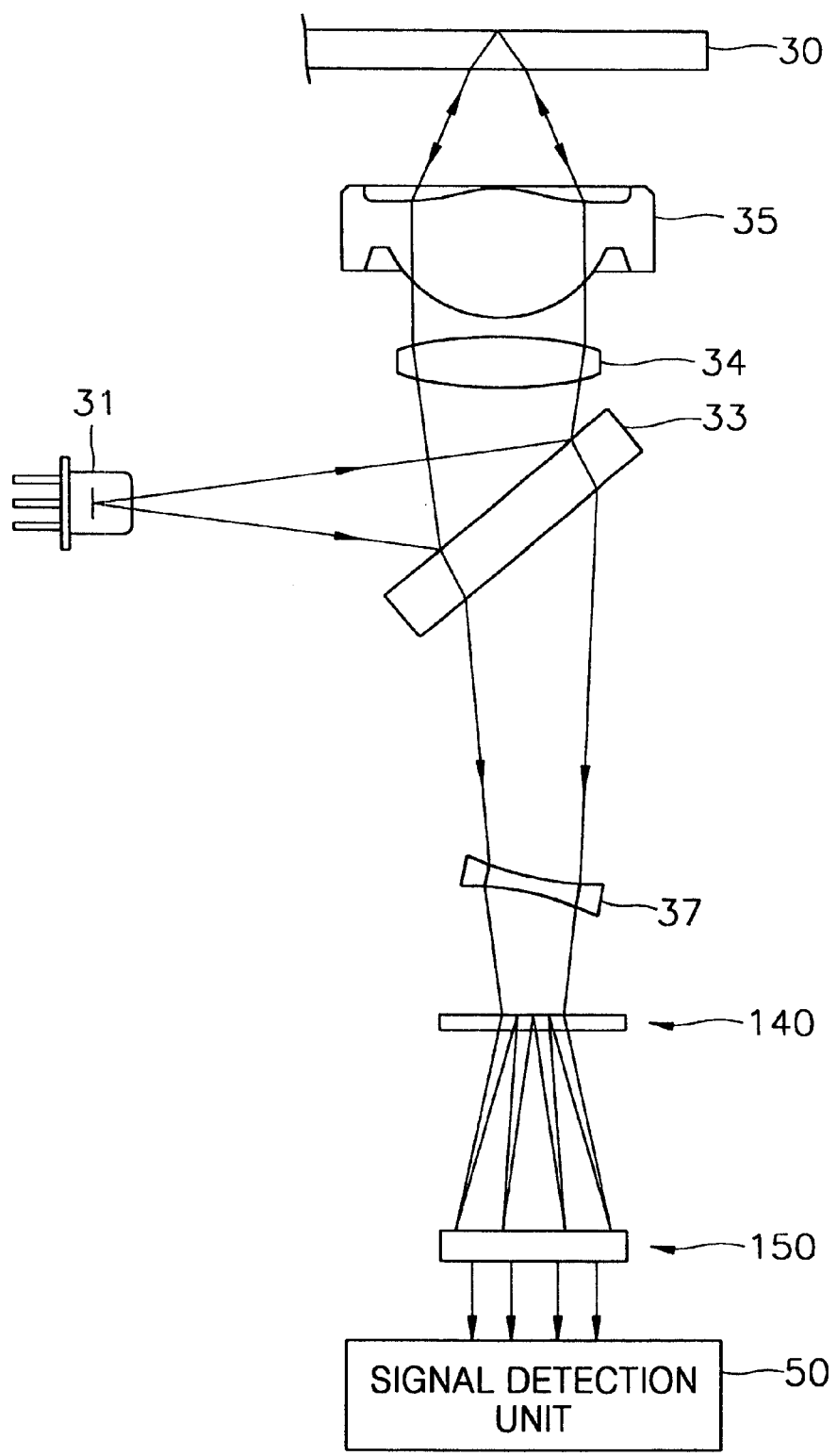
FIG. 13 is a schematic view of another embodiment of the optical pickup according to the present invention.

FIG. 13 illustrates the optical arrangement of an optical pickup according to another embodiment of the present invention. In FIG. 13, the same elements as those of FIG. 3 are denoted by the same reference numerals. In the present embodiment, a light detection unit includes an optical member 140 to selectively diffract light incident after having been reflected from the optical recording medium 30 so as to split incident light into first through fourth light beam portions in the radial direction of the optical recording medium 30, and a photodetector 150 to receive the first through fourth light beam portions from the optical member 140, and photoelectrically convert the individual first through fourth light beam portions.

Figure 14:
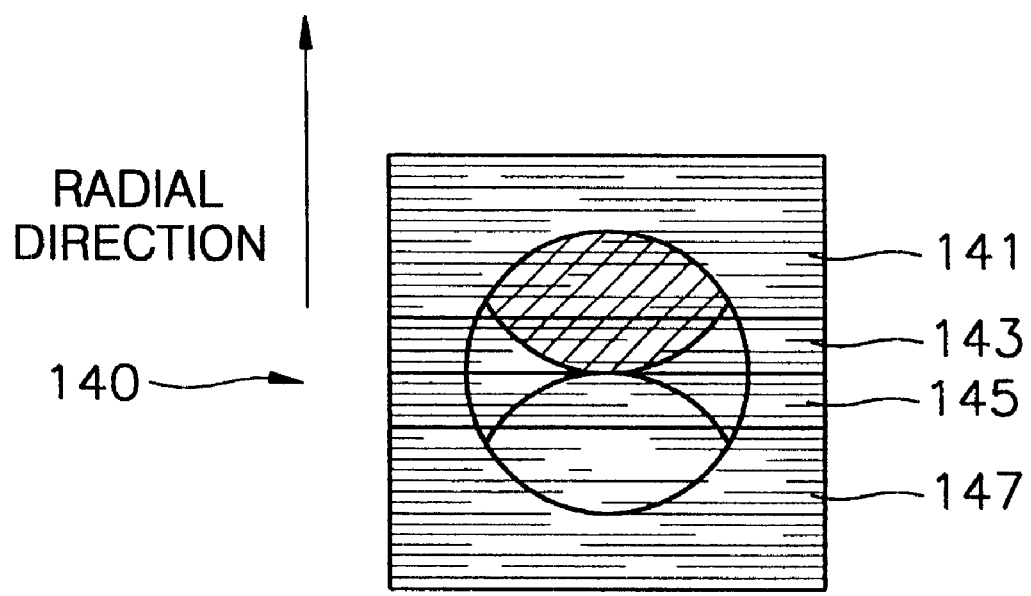
FIG. 14 schematically shows an optical member according to an embodiment of the present invention.

As shown in FIG. 14, the optical member 140 includes a diffraction element including first through fourth patterns 141 through 147 to divide and diffract incident light to output separate first through fourth light beam portions. The width of the second and third pattern portions 143 and 145 is determined such that the second and third pattern portions 143 and 145 receive 10–90% of the diameter of incident light in the radial direction of the optical recording medium 30, like the second and third light receiving portions B and C of the photodetector 40 shown in FIG. 4.

The first and second pattern portions 141 and 143 have a diffraction pattern, such as a hologram pattern, to diffract incident light into −1st-order beams at different angles. In a similar way, the third and fourth pattern portions 145 and 147 have a diffraction pattern such as a hologram pattern to diffract incident light into +1st-order beams at different angles. While not shown, it is understood that some of the first through fourth pattern portions 141, 143, 145 and 147 may be a transparent member to transmit incident light, or may be formed as a hole. Alternatively, some of the first through fourth pattern portions 141, 143, 145 and 147 may have a diffraction pattern to diffract and transmit incident light into a 0th-order beam.

Figure 15:
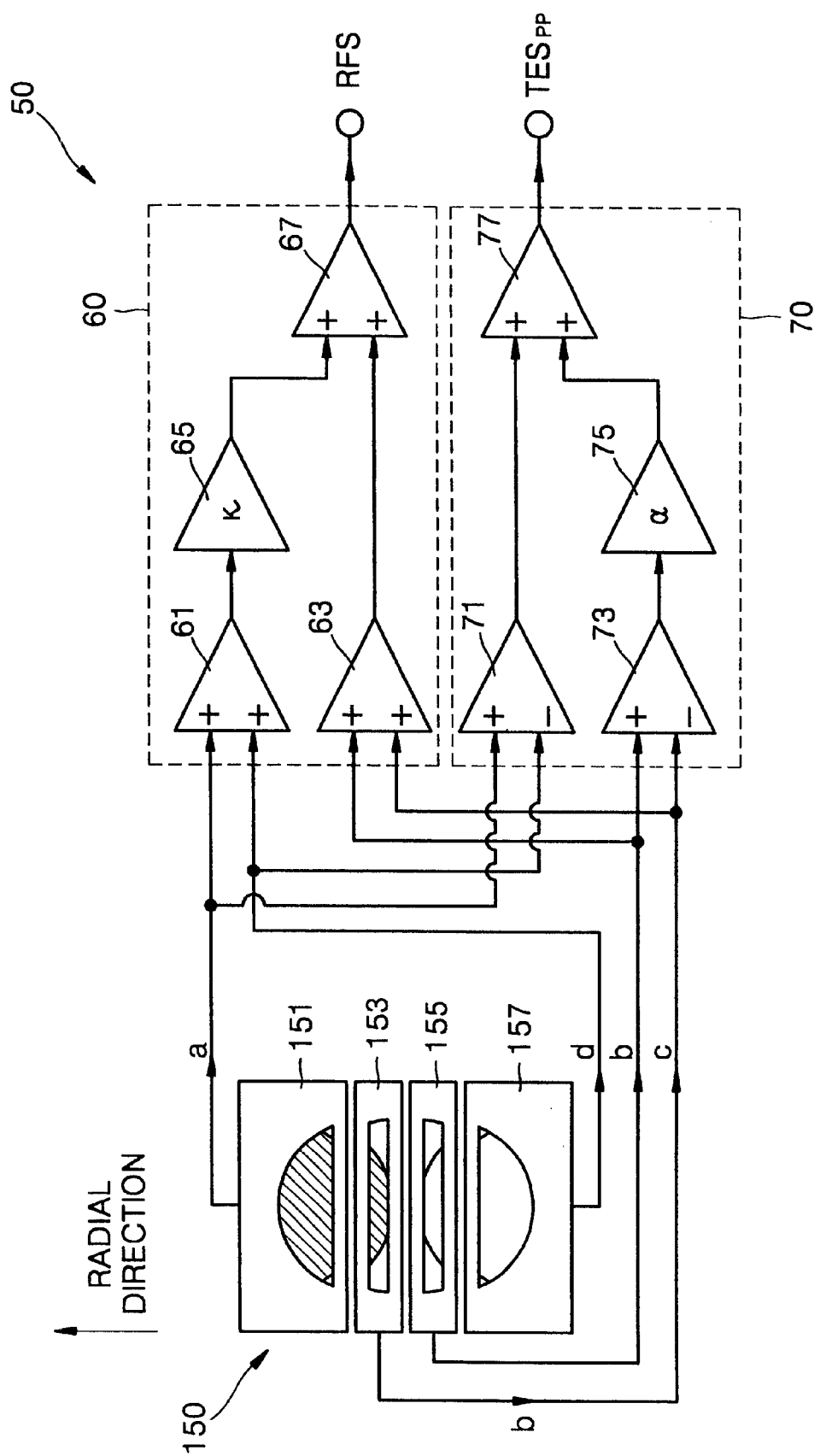
FIG. 15 schematically shows the structure of the photodetector and the signal processor shown in FIG. 13 according to an embodiment of the present invention.

As shown in FIG. 15, the photodetector 150 includes first through fourth photodetectors 151, 153, 155 and 157 corresponding to the respective pattern portions 141, 143, 145 and 147 of the optical member 140. The first through fourth photodetectors 151, 153, 155 and 157 receive light from the first through fourth pattern portions 141, 143, 145 and 147 of the optical member 140, respectively.

The structure of the signal processor 50, the process of detecting the tracking error signal TESpp with reduced push-pull offset, and the process of detecting the reproduction signal RFS from which crosstalk from adjacent tracks has been reduced are substantially the same as in the previous embodiment shown in FIG. 4, and thus descriptions thereof will not be provided here.

As discussed above, the optical pickup according to the present invention uses an optical system which allows a single light spot to be formed only on the main track of the optical recording medium, and thus a tracking error signal with reduced push-pull offset can be detected even when the objective lens is shifted in the radial direction. As there is only one light spot, there is no erasing of a signal already written to adjacent tracks occurs during a writing operation.

Further, an optical pickup according to the present invention detects a reproduction signal including less crosstalk from adjacent tracks. Thus, the optical pickup is suitable for use with a high-density optical recording medium with narrow track pitch.

While a few preferred embodiments of the invention have been particularly shown and described, it would be understood by those skilled in the art that various changes in form and details may be made thereto without departing from the spirit and scope of the invention as defined by the claims and their equivalents.

What is claimed is:

1. An optical pickup to record/reproduce data to/from an optical recording medium, comprising:
    a light source to generate a light;
    an optical path changer to alter an optical path of incident light;
    an objective lens disposed in an optical path between said optical path changer and the optical recording medium, said objective lens to focus incident light generated by said light source as a single light spot on the optical recording medium;
    a light detection unit to detect light incident through said objective lens and said optical path changer after having been reflected from the optical recording medium, to divide the incident light into first through fourth light beam portions in a radial direction of the optical recording medium, to detect the first through fourth light beam portions, and to generate detection signals; and
    a signal processor having a tracking error signal detection portion to detect a tracking error signal from the detection signals output from said light detection unit, wherein
        the tracking error signal detection portion amplifies or attenuates the detection signals either from the first and fourth light beam portions, which are outside the second and third light beam portions, or from the second and third light beam portions, and detects a push-pull signal using the amplified or attenuated detection signals and the remaining detection signals.

2. The optical pickup of claim 1, wherein the tracking error signal detection portion comprises:
    a first differential part to subtract the detection signals from the first and fourth light beam portions;
    a second differential part to subtract the detection signals from the second and third light beam portions;
    an adder to sum the signals from the first and second differential parts to output the tracking error signal with reduced push-pull offset; and
    a gain controller connected between either the first or second differential parts and an input end of the adder, the gain controller to amplify or attenuate the signal from the first or second differential parts with a predetermined gain factor, and to output the product to the adder so that the adder outputs the tracking error signal with reduced push-pull offset.

3. The optical pickup of claim 2, wherein
    the gain controller is connected between the second differential part and the adder, and
    the adder outputs a tracking error signal expressed as $$\text{tracking error signal} = (a-d) + \alpha(b-c),$$

where a, b, c and d represent the detection signals from the first through fourth light beam portions, respectively, and α is the gain factor of the gain controller.

4. The optical pickup of claim 3, wherein the gain factor of the gain controller is adjusted such that the tracking error signal has a minimum push-pull offset.

5. The optical pickup of claim 2, wherein the gain factor of the gain controller is adjusted such that the tracking error signal has a minimum push-pull offset.

6. The optical pickup of claim 1, wherein the tracking error signal detection portion detects a tracking error signal expressed as $$\text{tracking error signal} = (a-d) + \alpha(b-c),$$

where a, b, c and d represent the detection signals from the first through fourth light beam portions, respectively, and α is the gain factor of the gain controller.

7. The optical pickup of claim 6, wherein the gain factor is adjusted such that the tracking error signal has a minimum push-pull offset.

8. The optical pickup of claim 1, wherein the amplification or attenuation is determined by a gain factor that is adjusted such that the tracking error signal has a minimum push-pull offset.

9. The optical pickup of claim 1, wherein the signal processor further comprises a reproduction signal detection portion comprising:
a gain controller to amplify or attenuate either a first sum signal of the detection signals from the first and fourth light beam portions, or a second sum signal of the detection signals from the second and third light beam portions, with a predetermined gain factor; and
an adder having a first input end that receives the gain controlled one of the first or second sum signals from the gain controller and a second input end that receives the one of the first and second sum signals that does not pass through the gain controller, the adder sums the received signals and outputs the sum of the received signals as a reproduction signal containing reduced crosstalk from adjacent tracks.

10. The optical pickup of claim 9, wherein
the gain controller of the reproduction signal detection portion amplifies or attenuates the first sum signal with the predetermined gain factor and outputs the product to the adder, and
the adder outputs the reproduction signal expressed as reproduction signal=$(b+c)+\kappa(a+d)$, where a, b, c and d represent the detection signals from the first through fourth light beam portions, respectively, and $\kappa$ is the gain factor of the gain controller.

11. The optical pickup of claim 10, wherein the gain factor of the gain controller is adjusted such that the reproduction signal has a minimum crosstalk from adjacent tracks.

12. The optical pickup of claim 9, wherein the gain factor of the gain controller is adjusted such that the reproduction signal has a minimum crosstalk from adjacent tracks.

13. The optical pickup of claim 1, wherein a width of the second and third light beam portions in the radial direction of the optical recording medium is 10–90% of a diameter of the light reflected from the optical recording medium.

14. The optical pickup of claim 13, wherein said light detection unit comprises a photodetector having first through fourth light receiving portions arranged in the radial direction of the optical recording medium, the first through fourth light receiving portions to receive the first through fourth light beam portions, respectively, and independently converts the first through fourth light beam portions to respective electrical signals.

15. The optical pickup of claim 14, wherein the first through fourth light receiving portions comprise eight light receiving subportions obtained by dividing each of the first through fourth light receiving portions into two sections in a tangential direction of the optical recording medium.

16. The optical pickup of claim 13, wherein said light detection unit comprises:
an optical member to selectively diffract light incident after having been reflected from the optical recording medium so as to divide the incident light into the first through fourth light beam portions in the radial direction of the optical recording medium; and
first through fourth photodetectors to receive the first through fourth light beam portions from the optical member, and to convert the received first through fourth light receiving portions into respective electrical signals.

17. The optical pickup of claim 1, wherein said light detection unit comprises a photodetector having first through fourth light receiving portions arranged in the radial direction of the optical recording medium, the first through fourth light receiving portions to receive the first through fourth light beam portions, respectively, and to independently converting the first through fourth light beam portions into respective electrical signals.

18. The optical pickup of claim 17, wherein the four light receiving portions comprise eight light receiving subportions obtained by dividing each of the first through fourth light receiving portions into two sections in a tangential direction of the optical recording medium.

19. The optical pickup of claim 1, wherein said light detection unit comprises:
an optical member to selectively diffract the light incident after having been reflected from the optical recording medium so as to divide the incident light into the first through fourth light beam portions in the radial direction of the optical recording medium; and
first through fourth photodetectors to receive the first through fourth light beam portions from the optical member, and to convert the received first through fourth light beam portions into respective electrical signals.

20. An optical pickup to record/reproduce data to/from an optical recording medium, comprising:
a light source to generate a light;
an optical path changer to alter an optical path of incident light;
an objective lens disposed in an optical path between said optical path changer and the optical recording medium, said objective lens to focus the light generated by said light source on a target track of the optical recording medium;
a light detection unit to detect the light incident through said objective lens and said optical path changer after having been reflected from the optical recording medium, said light detection unit to divide the incident light into first through fourth light portions, and to output corresponding first through fourth detection signals; and
a reproduction signal detector that sums and gain controls the first through fourth detection signals to output a reproduction signal where cross talk caused by a track adjacent to the target track is reduced.

21. The optical pickup of claim 20, wherein a jitter value for the reproduction signal is equal to or less than approximately 10% where a track pitch of the optical recording medium is equal to or between 0.29 $\mu$m and 0.35 $\mu$m.

22. The optical pickup of claim 20, wherein:
the second and third light portions are disposed between the first and fourth light portions, and
said reproduction signal detector comprises
a first adder to sum the first and fourth detection signals to produce a first signal, and
a second adder to sum the second and third detection signals to produce a second signal,
wherein
the first signal is approximately 180° out of phase with the second signal for a portion of the reproduction signal caused by the adjacent track, and
the first and second signals are approximately in phase with each other for a portion of the reproduction signal caused by the target track.

23. The optical pickup of claim 20, wherein said reproduction signal detector comprises:
a first adder to sum the first and fourth detection signals to produce a first signal, a second adder to sum the second and third detection signals to produce a second signal, a gain controller to gain control the first signal, and a third adder to sum the second signal and the gain controlled first signal to produce the reproduction signal.

24. The optical pickup of claim 23, wherein:

the second and third light portions are disposed between the first and fourth light portions, the first signal is approximately 180° out of phase with the second signal for a portion of the reproduction signal caused by the adjacent track, and the first and second signals are approximately in phase with each other for a portion of the reproduction signal caused by the target track.

25. An optical pickup to record/reproduce data to/from an optical recording medium, comprising:

a light source to generate a light;

an optical path changer to alter an optical path of light incident from either said light source or reflected from the optical recording medium;

an objective lens disposed in an optical path between said optical path changer and the optical recording medium, said objective lens to focus the light generated by said light source on a target track of the optical recording medium;

a light detection unit to detect the light reflected from the target track through said objective lens and said optical path, said light detection unit to divide the light reflected from the target track into first through fourth light portions, and to output corresponding first through fourth detection signals; and a tracking error signal detector that sums and/or gain controls push-pull signals generated from the first through fourth detection signals to output a tracking error signal, wherein:

the tracking error signal detection portion detects a tracking error signal=(a−d)+α(b−c), (a−d) represent a group of the detection signals comprising a difference between one of the first and second light beam portions and one of the third and fourth light beam portions, (b−c) represent another group of the detection signals comprising a difference between the other of the first and second light beam portions and the other of the third and fourth light beam portions, and α is a gain factor which amplifies or attenuates the another group of the detection signals (b−c).

26. The optical pickup of claim 25, wherein the light from said objective lens forms a single light spot on the target track, and does not form another light spot on a track adjacent to the target track.

27. The optical pickup of claim 25, wherein the tracking error signal has approximately no push-pull offset for a shift of said objective lens along a radial direction of the optical recording medium.

28. The optical pickup of claim 25, wherein a push-pull offset is less than 3% for shifts of said objective lens greater than or equal to 100 μm along a radial direction of the optical recording medium.

29. The optical pickup of claim 25, wherein said tracking error signal detector generates one of the push-pull signals from the second and third detection signals, and the second and third light portions are disposed between the first and fourth light detection portions.

30. The optical pickup of claim 29, wherein the combined second and third light portions comprise between 10% and 90% of a diameter of the light reflected from the target track.

31. A method of generating a tracking error signal for use in an optical pickup, comprising:

providing a light beam incident on a target track of an optical recording medium;

generating push-pull signals from portions of the light reflected from the target track;

gain controlling one of the push-pull signals by a first gain control factor; and generating the tracking error signal from the one gain controlled push-pull signal in combination another of the push-pull signals which has not been gain controlled using the first gain control factor.

32. The method of claim 31, further comprising receiving the light reflected from the target track on a photodetector having four detector portions arrayed along a radial direction of the optical recording medium, wherein said generating the push-pull signals comprises generating an inner push-pull signal from inner ones of the detector portions disposed between outer ones of the detector portions in the radial direction, and generating an outer push-pull signal from the outer detector portions.

33. The method of claim 32, wherein:

said gain controlling the one push-pull signal comprises gain controlling the inner push-pull signal, and said generating the tracking error signal comprises adding the outer push-pull signal with the gain controlled inner push-pull signal to produce the tracking error signal.

34. The method of claim 32, wherein:

said gain controlling the one push-pull signal comprises gain controlling the outer push-pull signal, and said generating the tracking error signal comprises adding the inner push-pull signal with the gain controlled outer push-pull signal to produce the tracking error signal.

35. A method of generating a reproduction signal for use in an optical pickup, comprising:

providing a light beam incident on a target track of an optical recording medium;

generating signals from portions of the light reflected from the target track;

gain controlling a first plurality of the signals; and summing the gain controlled first plurality of signals and a second plurality of the signals to generate the reproduction signal such that cross-talk from a track adjacent to the target track is reduced.

36. The method of claim 35, further comprising receiving the light reflected from the target track on a photodetector having four detector portions arrayed along a radial direction of the optical recording medium, wherein said generating the signals comprises generating an inner summed signal from inner ones of the detector portions disposed between outer ones of the detector portions in the radial direction, and generating an outer summed signal from the outer detector portions, the first plurality of signals comprises the inner summed signal, and the second plurality of signals comprises the outer summed signal.

37. The method of claim 35, further comprising receiving the light reflected from the target track on a photodetector having four detector portions arrayed along a radial direction of the optical recording medium, and wherein said generating the signals comprises generating an inner summed signal from inner ones of the detector portions disposed between outer ones of the detector portions in the radial direction, and generating an outer summed signal from the outer detector portions, the first plurality of signals comprises the outer summed signal, and the second plurality of signals comprises the inner summed signal.

\* \* \* \* \*